INVENTOR.
GEORG J.E. GOUBAU
BY Harry M. Saragovitz
Attorney

May 12, 1953 G. J. E. GOUBAU 2,638,572

PULSE MODULATION SYSTEM

Filed May 25, 1951 2 Sheets-Sheet 2

INVENTOR.
GEORG J. E GOUBAU

BY Harry M. Saragovitz
Attorney

Patented May 12, 1953

2,638,572

UNITED STATES PATENT OFFICE 2,638,572

PULSE MODULATION SYSTEM

Georg J. E. Goubau, Long Branch, N. J., assignor to the United States of America as represented by the Secretary of the Army Application May 25, 1951, Serial No. 228,349

7 Claims. (Cl. 332—9)

(Granted under Title 35, U. S. Code (1952), sec. 266)

The invention described in the following specification and claims may be manufactured and used by or for the Government for governmental purposes, without the payment to me of any royalty thereon.

This invention relates to a pulse generator system and more particularly to a modulated pulse generator system having means for modulating the frequency or rate of occurrence of the generated pulses in accordance with modulating potentials.

It has been proposed to transmit intelligence in the form of a train of pulses spaced apart according to a function of the amplitude of a modulating voltage which may represent the intelligence to be transmitted. Heretofore, such systems have not proved practical for use with portable equipment because some form of synchronization between the transmitter and the demodulator was required.

It is an object of the present invention, therefore, to provide an improved and simplified pulse modulation system wherein no synchronization is required.

It is a further object of the present invention to enable the generation of pulses whose pulse rate can be frequency modulated in accordance with the modulating voltage.

It is still a further object of the present invention to provide a pulse generator system wherein the pulse frequency or rate of recurrence of the generated pulses varies in inverse proportion to the modulating voltage.

In accordance with the embodiment of the present invention to be described herein, a sinusoid voltage of varying frequency, for example the output of a voice microphone, is caused to modulate the output of a saw-tooth generator circuit so that the amplitude level, or charging period, of the saw-tooth wave is substantially proportional to the amplitude of the modulating voltage. At the end of each charging period a pulse is generated, thus producing a train of pulses having a frequency which varies in inverse proportion to the amplitude of the modulating voltage. These pulses are applied to a pulse forming circuit whose purpose is to shape the pulse to a shape optimum for the operating of a transmitter. The output from the pulse forming circuit is used both for modulating the transmitter, and through the medium of a delay line, for terminating the period of the saw-tooth wave so that the saw-tooth generator circuit may proceed through another cycle. The delay line provides a delay interval sufficient to develop the required pulse amplitude for operating the saw-tooth circuit.

For a better understanding of the present invention, together with other and further objects thereof, reference is had to the following description taken in connection with the accompanying drawings, in which.

Figure 3:
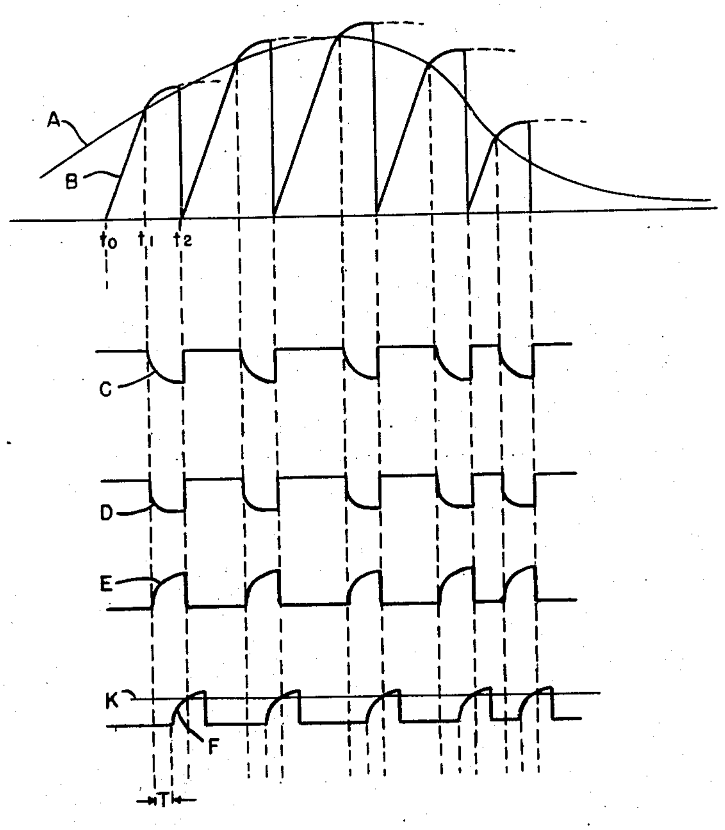
Figure 2:
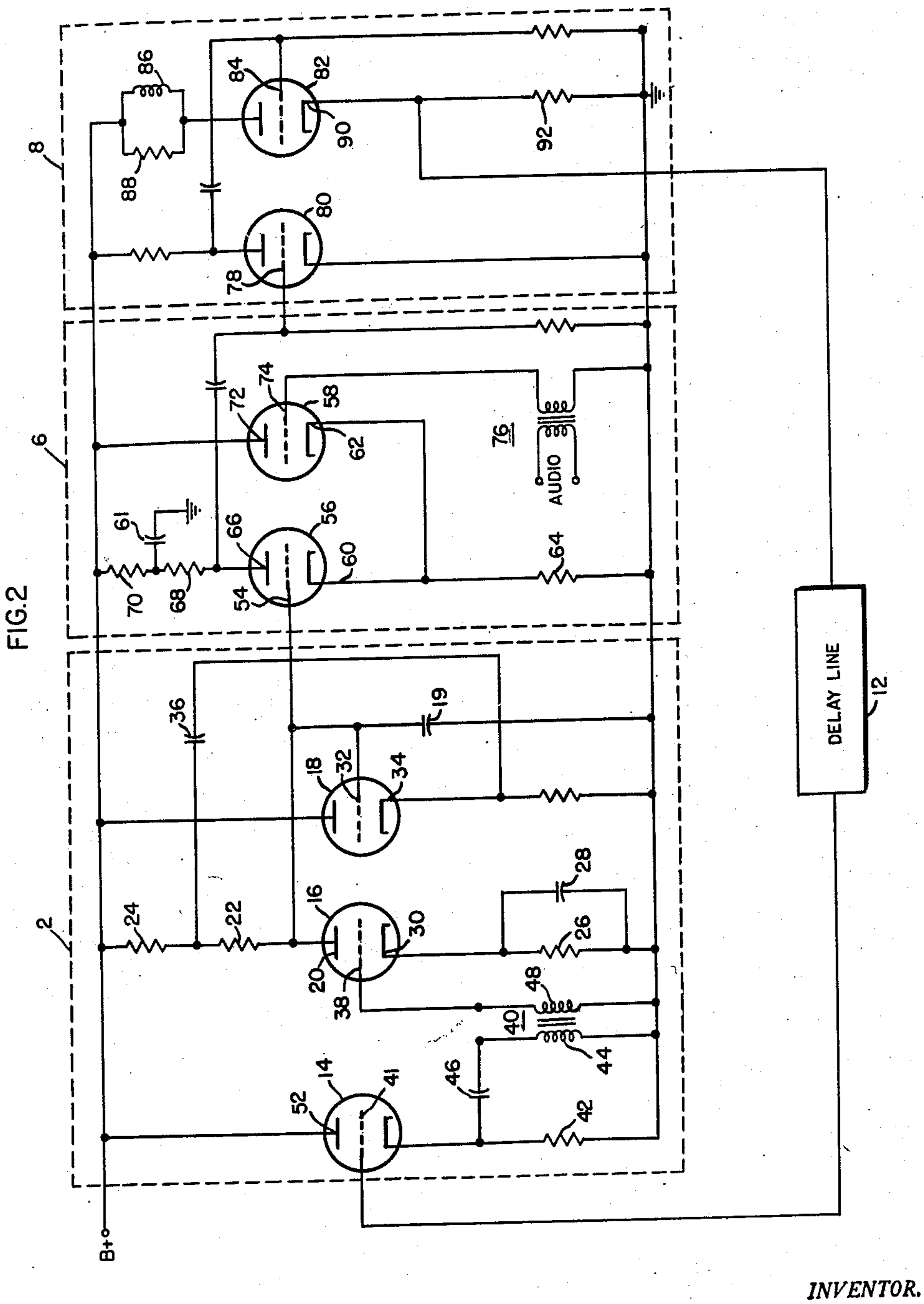
Figure 2 illustrates the detailed circuits of the system of Figure 1.

Figure 3 includes a series of graphs utilized in explaining the operation of the Figure 2 arrangement.

Figure 1:
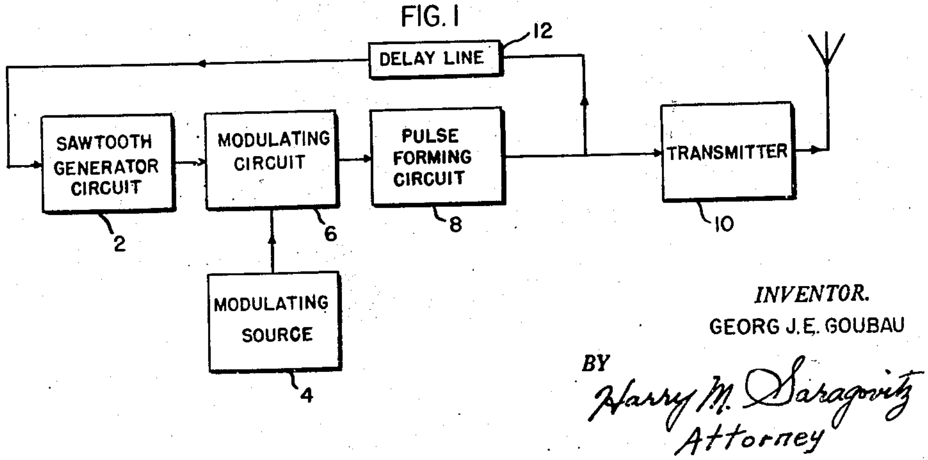
Figure 1 is a block diagram of a pulse generator system in accordance with the invention.

Referring now to Figure 1 of the drawings, there is shown a pulse generator system for generating a plurality of time-spaced pulses having a frequency which varies in inverse proportion to the amplitude of the modulation voltage. The system includes a saw-tooth generator circuit 2 for deriving a linear voltage of saw-tooth waveform having a positive slope. The saw-tooth voltage is combined with the modulation voltage derived from source 4 in modulating circuit 6 which determines the amplitude level, or linear charging period, of the saw-tooth voltage. Modulating circuit 6 includes means for generating a transient current pulse when the amplitude level of the saw-tooth voltage reaches the modulation voltage. The transient output of modulating circuit 6 is applied to pulse forming circuit 8 for generating constant width pulses of short duration at the end of each charging period. These pulses are used both for modulating transmitter 10, and, through the medium of delay line 12, for terminating the charging period so that the cycle may be repeated.

Figure 2 shows the circuit diagram for the system of Figure 1. Vacuum tubes 14, 16 and 18 and their associated circuits comprise saw-tooth generator circuit 2. The saw-tooth voltage is developed across capacitor 19 connected between plate 20 of saw-tooth generator tube 16 and ground. Plate 20 is connected to a positive source of potential B+, which may be provided in the conventional manner, through series connected resistors 22 and 24. Tube 16 is self-biased by the parallel arrangement of resistor 26 and capacitor 28 connected between cathode 30 of tube 16 and ground.

To obtain a linear saw-tooth rise with a positive slope, a conventional boot-strap cathode follower circuit is provided. As shown, the saw-tooth voltage developed across capacitor 19 is applied to grid 32 of cathode follower 18. The output from cathode 34 of tube 18 is coupled to the junction of series connected resistors 22 and 24 through coupling capacitor 36. The normally constant voltage at the positive end of resistor 22 has thus superimposed upon it the rising voltage on charging capacitor 19 so that the voltage drop across resistor 22, and hence the charging current, is maintained practically constant.

As will hereinafter be explained, saw-tooth generator tube 16 is controlled by pulses which are applied to grid 38 of tube 16 by means of cathode follower 14 and coupling transformer 40. These pulses are applied to grid 41 of cathode follower tube 14 from the output of delay line 12 and the consequent pulses developed across cathode resistor 42 of tube 14 are applied to primary winding 44 of transformer 40 through capacitor 46. As shown, the free end of primary winding 44 is connected to ground. Secondary winding 48 of transformer 40 is connected between grid 38 and ground. Plate 52 of cathode follower tube 14 is connected directly to B+. The windings of transformer 40 are poled so that there is no polarity reversal of signals applied to its primary winding.

The linear saw-tooth output voltage developed across capacitor 19 is applied to grid 54 of vacuum tube 56, which, together with vacuum tube 58 and its associated circuits comprises modulating circuit 6. Cathodes 60 and 62 are connected to ground by common cathode resistor 64. Plate 66 of tube 56 is connected to B+ through series connected resistors 68 and 70. Plate 72 of tube 58 is connected directly to B+. Because of the voltage developed across common cathode resistor 64 due to the plate current drawn by tube 58, tube 56 is normally biased to cut-off. Capacitor 61 is connected between the junction of plate resistors 68 and 70 and ground to effectively reduce the plate voltage applied to plate 66 to a relatively low value. Thus, by this arrangement, tube 56 will be rendered transiently conductive only when the amplitude of the saw-tooth voltage applied to grid 54 is great enough to overcome the bias developed across common cathode resistor 64.

As shown, audio modulating voltage is applied to grid 74 of tube 58 by means of audio coupling transformer 76. It is to be understood of course that any other suitable coupling means may be used. The plate current of tube 58 is thus controlled by the audio modulating voltage to develop a bias voltage across common cathode resistor 64 which is proportional to the amplitude of the modulating voltage. When the linearly rising saw-tooth voltage developed across capacitor 19 reaches an amplitude sufficient to overcome the bias voltage across resistor 64, capacitor 19 is effectively connected across the grid-cathode circuit of tube 56 and is thus rapidly charged by grid current to a steady state voltage. During this period, tube 56 may be said to be transiently conductive and the transient plate current thus produced generates a negative voltage pulse in the plate circuit thereof.

The output from plate 66 is capacity coupled to grid 78 of amplifier tube 80, which together with pulse forming tube 82, comprises pulse forming circuit 8. The output of amplifier tube 80 is capacity coupled to grid 84 of pulse forming tube 82. The anode load of tube 82 includes a pulse shaping network comprising inductance 86 shunted by resistor 88. Cathode 90 of tube 82 is connected to ground through resistor 92. The output of cathode 90 is applied to grid 41 of tube 14 through a suitable delay line 12 which provides a sufficient delay to permit the voltage developed across cathode resistor 92 to reach an amplitude capable of operating the saw-tooth generator circuit.

The curves in Figure 3 clearly illustrate the operation of the pulse generator described. In this figure, curve A represents an exaggerated portion of the modulating voltage from source 4. Inasmuch as the voltage developed across common cathode resistor 64 is proportional to the modulating voltage, curve A may also represent the bias voltage applied to tube 56. Curve B represents the saw-tooth voltage developed across capacitor 19 which is applied to grid 54 of tube 56. For the period $t_0$–$t_1$, curve B represents the linear saw-tooth voltage developed across capacitor 19 which is charged through resistor 22. During this period, tube 56 is not conducting. At time $t_1$, the amplitude of the saw-tooth voltage has reached the amplitude of the bias voltage, and, at this instant, tube 56 is rendered conductive. Capacitor 19 is thus connected in the grid-cathode circuit of tube 56 and is now charged by grid current flowing in the grid-cathode circuit. As a result, the voltage across capacitor 19 reaches a steady state value at time $t_2$. The period $t_1$–$t_2$ may be designated as the transient period and current in the cathode-plate circuit of tube 56 during this period may be termed the transient current. As explained above, a relatively short transient period is provided by reducing the voltage applied to plate 66 to a relatively low value.

Curve C illustrates the negative pulse developed at plate 66 during the transient period. It may be assumed that the transient period for successive saw-tooth waves is substantially constant, thus providing a train of constant width negative pulses. The negative pulses illustrated in curve C are amplified in tube 80 and the amplified positive output pulses from said tube are applied to pulse forming tube 82. The output of the plate circuit of tube 82 is represented by curve D and may be applied through suitable shaping circuits to pulse a transmitter.

Curve E represents the positive output pulse developed across cathode resistor 92 during the transient period which is applied to the input circuit of delay line 12. The interval T represents the amount of delay provided by delay line 12. The output of the delay line, illustrated in curve F, is applied to grid 41 of tube 14. The cathode output of tube 14 is thus applied to primary winding 44 as a positive pulse. Since there is no reversal of polarity through transformer 40, the positive pulses shown in curve F are also applied to grid 38 of saw-tooth generator tube 16 through secondary winding 48. It is to be assumed that when the pulses applied to grid 38 reaches an amplitude represented by the line K, saw-tooth generator tube 16 is triggered to discharge capacitor 19, and, consequently, the cycle is repeated. It is to be understood, of course, that by merely adjusting the delay interval T, the discharge of capacitor 19 may be made to occur at any convenient time after the steady state voltage has been reached.

For increasing amplitudes of modulating voltage, it is apparent that the charging period $t_0$–$t_1$ will be proportionally increased and, for decreasing amplitudes of audio voltages, the charging period $t_0$–$t_1$ will be proportionally decreased. Thus, the output of pulse forming tube 82 comprises a plurality of time-spaced pulses having a frequency, or rate of occurrence, which varies in inverse proportion to the amplitude of the modulating voltage.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A pulse generator system comprising, in combination, means for generating a periodic voltage of saw-tooth waveform, a source of modulating voltage, means connected to said modulating voltage and the output circuit of said saw-tooth generating means for combining said saw-tooth voltage and said modulating voltage whereby the amplitude level of said saw-tooth voltage is substantially proportional to the amplitude of said modulating voltage, a pulse forming circuit connected to the output of said last mentioned means for generating signal pulses having a frequency which varies in inverse proportion to the amplitude of said modulating voltage, said pulses being generated at a period corresponding to the peaks of said saw-tooth voltages, and a delay line connected between said pulse forming circuit and the input circuit of said generating means to terminate the period of said saw-tooth voltage a predetermined time after the initiation of said pulses.

2. A pulse generating system comprising, in combination, means for generating a voltage having a saw-tooth waveform of positive slope, a source of modulating voltage, means for modulating said saw-tooth voltages in accordance with said modulating voltage whereby the amplitude level of said saw-tooth voltage is substantially proportional to said modulating voltage, means for generating pulse signals at the peaks of said saw-tooth voltage, said pulses having a frequency which varies in inverse proportion to the amplitude of said modulating voltage, and a delay line connecting said last mentioned means and said saw-tooth generating means to terminate the period of said saw-tooth voltage a predetermined time after the initiation of said pulse signals.

3. A pulse generator system comprising in combination, an aperiodic saw-tooth wave generator for generating substantially linear voltages of saw-tooth waveform, a source of modulating voltage, a normally non-conducting vacuum tube connected to said modulating voltage source and said saw-tooth wave generator for combining said saw-tooth voltage and said modulating voltage, means for biasing said vacuum tube in accordance with said modulating voltage whereby the amplitude level of said saw-tooth voltage is substantially proportional to the amplitude of said modulating voltage, said vacuum tube being rendered transiently conductive only when the amplitude of said saw-tooth voltage reaches the amplitude of said modulation voltage, means responsive to the transient current in said vacuum tube for generating pulses having a frequency which varies in inverse proportion to the amplitude of said modulating voltage, and delay means connected to said last mentioned means and the input circuit of said saw-tooth wave generator for terminating said saw-tooth voltage period a predetermined time after the initiation of said transient current.

4. A pulse generator system comprising a saw-tooth wave generator for generating substantially linear voltages of saw-tooth waveform having a positive slope, a source of modulating voltage, a first vacuum tube, normally non-conductive, having at least a grid, a plate, and a cathode, a second vacuum tube having at least a plate, grid, and cathode, the cathodes of said first and second tubes having a common cathode resistor, the grid of said first tube being connected to the output of said saw-tooth generator, the grid of said second tube being connected to said modulating source whereby said first tube is biased in accordance with said modulating voltage to control the amplitude level of said saw-tooth voltage, said first vacuum tube being rendered transiently conductive when the amplitudes of said modulating voltages and said saw-tooth voltages are substantially equal, means connected to the plate of said first tube responsive to the transient current for generating signal pulses having a frequency which varies in inverse proportion to the amplitude of said modulating voltage, and delay means connected between said pulse generating means and said saw-tooth generator to terminate the period of said saw-tooth voltage a predetermined time after the initiation of said transient current.

5. A pulse generator system comprising in combination means for generating aperiodic voltages of substantially saw-tooth waveform, a modulating voltage source, means connected to said generating means and said modulating source for combining said saw-tooth and modulating voltages whereby the amplitude level of said saw-tooth voltage is controlled by the amplitude of said modulating voltage, means connected in circuit with said combining means for generating voltage pulses when the amplitudes of said modulating voltage and said saw-tooth voltage are substantially equal, and delay means connected to said last mentioned means and said saw-tooth generating means for terminating the period of said saw-tooth voltage a predetermined time after the initiation of said voltage pulses.

6. The pulse generator system defined in claim 4 wherein said pulse generating means comprises an amplifier having its input circuit coupled to the plate of said first vacuum tube, a third vacuum tube having at least a grid, plate, and cathode, the grid of said third tube being coupled to the output of said amplifier, the cathode of said third tube being connected to said delay means, and a pulse shaping network in circuit with the plate of said third tube.

7. The pulse generator system defined in claim 6 wherein said pulse shaping network comprises a resistor and an inductor connected in parallel.

GEORG J. E. GOUBAU.

References Cited in the file of this patent

UNITED STATES PATENTS

| Number | Name | Date |
|---|---|---|
| 2,545,346 | Edelsohn | Mar. 13, 1951 |